United States Patent
Liao et al.

(10) Patent No.: US 10,950,834 B2
(45) Date of Patent: Mar. 16, 2021

(54) CRUSHABLE COOLING COLUMN FOR BATTERY ASSEMBLY IN ELECTRIC VEHICLE

(71) Applicant: Purdue Research Foundation, West Lafayette, IN (US)

(72) Inventors: Hangjie Liao, West Lafayette, IN (US); Waterloo Tsutsui, West Lafayette, IN (US); Trung N Nguyen, Copley, OH (US); Thomas Heinrich Siegmund, West Lafayette, IN (US); Weinong Wayne Chen, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/910,232

(22) Filed: Mar. 2, 2018

(65) Prior Publication Data
US 2018/0254443 A1    Sep. 6, 2018

Related U.S. Application Data

(60) Provisional application No. 62/466,166, filed on Mar. 2, 2017.

(51) Int. Cl.
| | |
|---|---|
| *H01M 2/10* | (2006.01) |
| *H01M 10/613* | (2014.01) |
| *H01M 10/625* | (2014.01) |
| *H01M 10/643* | (2014.01) |
| *H01M 10/655* | (2014.01) |

(Continued)

(52) U.S. Cl.
CPC ............. *H01M 2/1094* (2013.01); *B60K 1/04* (2013.01); *B60L 50/64* (2019.02); *B60L 50/66* (2019.02); *B60L 58/26* (2019.02); *H01M 2/1083* (2013.01); *H01M 10/613* (2015.04); *H01M 10/625* (2015.04); *H01M 10/643* (2015.04); *H01M 10/655* (2015.04); *H01M 10/6557* (2015.04); *B60K 2001/0411* (2013.01); *B60K 2001/0416* (2013.01); *B60Y 2306/01* (2013.01); *H01M 2220/20* (2013.01); *Y02T 10/70* (2013.01)

(58) Field of Classification Search
CPC .................................................. H01M 2/1094
See application file for complete search history.

(56) References Cited

U.S. PATENT DOCUMENTS

| | | | |
|---|---|---|---|
| 4,174,014 A | 11/1979 | Bjorksten | |
| 4,267,895 A | 5/1981 | Eggert, Jr. | |

(Continued)

OTHER PUBLICATIONS

Stress-strain curve, Science Direct (Year: 2020).*

(Continued)

*Primary Examiner* — Brian R Ohara
(74) *Attorney, Agent, or Firm* — Piroozi-IP, LLC

(57) ABSTRACT

A battery packaging arrangement. The battery packaging arrangement includes a first base configured to be fixedly coupled to a frame of a vehicle, a second base moveable with respect to the first base, and a plurality of cooling columns inter-disposed between the first base and the second base. Each of the plurality of cooling columns includes a plurality of receiving surfaces for receiving a corresponding plurality of battery cells. Each of the plurality of cooling columns is further configured to deform when the second base in response to a force moves towards the first base.

16 Claims, 16 Drawing Sheets

(51) Int. Cl.
*H01M 10/6557* (2014.01)
*B60L 50/64* (2019.01)
*B60L 50/60* (2019.01)
*B60L 58/26* (2019.01)
*B60L 1/04* (2006.01)
*B60K 1/04* (2019.01)

(56) References Cited

U.S. PATENT DOCUMENTS

| | | | |
|---|---|---|---|
| 5,156,225 | A | 10/1992 | Murrin |
| 5,392,873 | A | 2/1995 | Masuyama et al. |
| 6,188,574 | B1 | 2/2001 | Anazawa |
| 6,613,472 | B1* | 9/2003 | Watanabe ............ H01M 10/625 429/112 |
| 6,709,783 | B2 | 3/2004 | Ogata et al. |
| 7,399,551 | B2 | 7/2008 | Yagi et al. |
| 8,573,647 | B2 | 11/2013 | Enning |
| 2004/0069620 | A1 | 4/2004 | Bitsche et al. |
| 2008/0311468 | A1* | 12/2008 | Hermann ............ H01M 2/1077 429/120 |
| 2011/0293986 | A1* | 12/2011 | Kozu .................... H01M 2/105 429/120 |
| 2012/0003522 | A1* | 1/2012 | Fuhr .................... H01M 2/1077 429/120 |
| 2012/0160088 | A1 | 6/2012 | Rawlinson |
| 2012/0244404 | A1 | 9/2012 | Obasih et al. |
| 2013/0004820 | A1 | 1/2013 | Tennessen et al. |
| 2015/0155534 | A1* | 6/2015 | Tsutsui ................ H01M 2/1094 429/97 |
| 2018/0069280 | A1* | 3/2018 | Mastrandrea ..... H01M 10/6557 |

OTHER PUBLICATIONS

Deformation of Rock (Year: 2020).*
Differences Between Elastic and Plastic Deformation (Year: 2018).*
Pictures (Year: 2020).*
Zhao et al.; Thermal performance of mini-channel liquid cooled cylinder based battery thermal management for cylindrical lithium-ion power battery; Energy Conversion and Management; 2015; 157-165; 103; ScienceDirect.
Kukreja et al.; Crash Analysis of a Conceptual Electric Vehicle with a Damage Tolerant Battery Pack; Extreme Mechanics Letters; Apr. 8, 2016; 371-378; vol. 9; ScienceDirect.
Hongguang et al.; Development of cooling strategy for an air cooled lithium-ion battery pack; Journal of Power Sources; 2014; 404-414; 272; ScienceDirect.
Kizilel et al.; An alternative cooling system to enhance the safety of Li-ion battery packs; Journal of Power Sources; 2009; 1105-1112; 194; ScienceDirect.
Singh et al.; Design, manufacture and test of a novel structural battery based on sandwich construction; Journal of Sandwich Structures and Materials; 2015; 666-690; 17(6); SAGE.

* cited by examiner

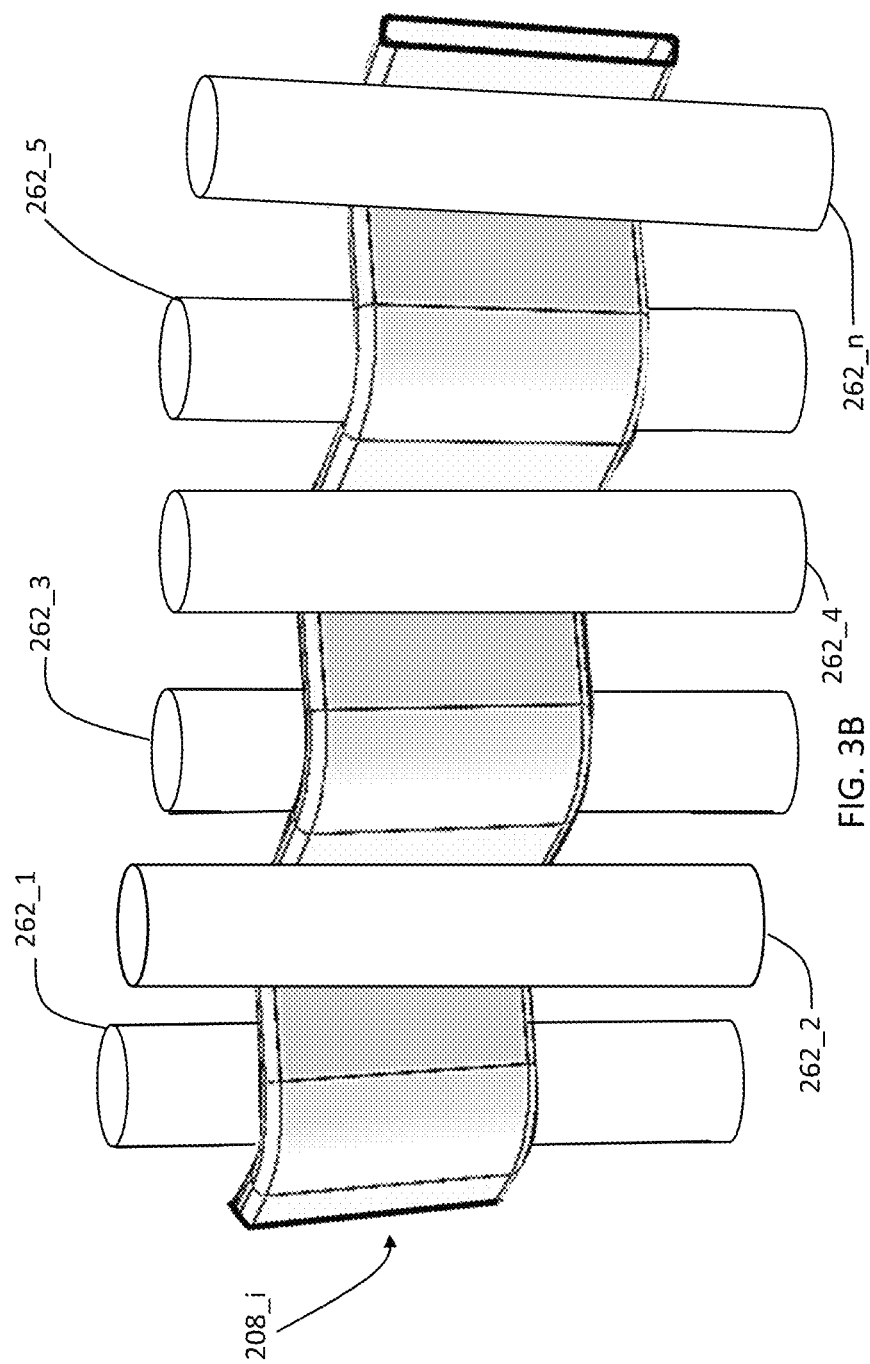

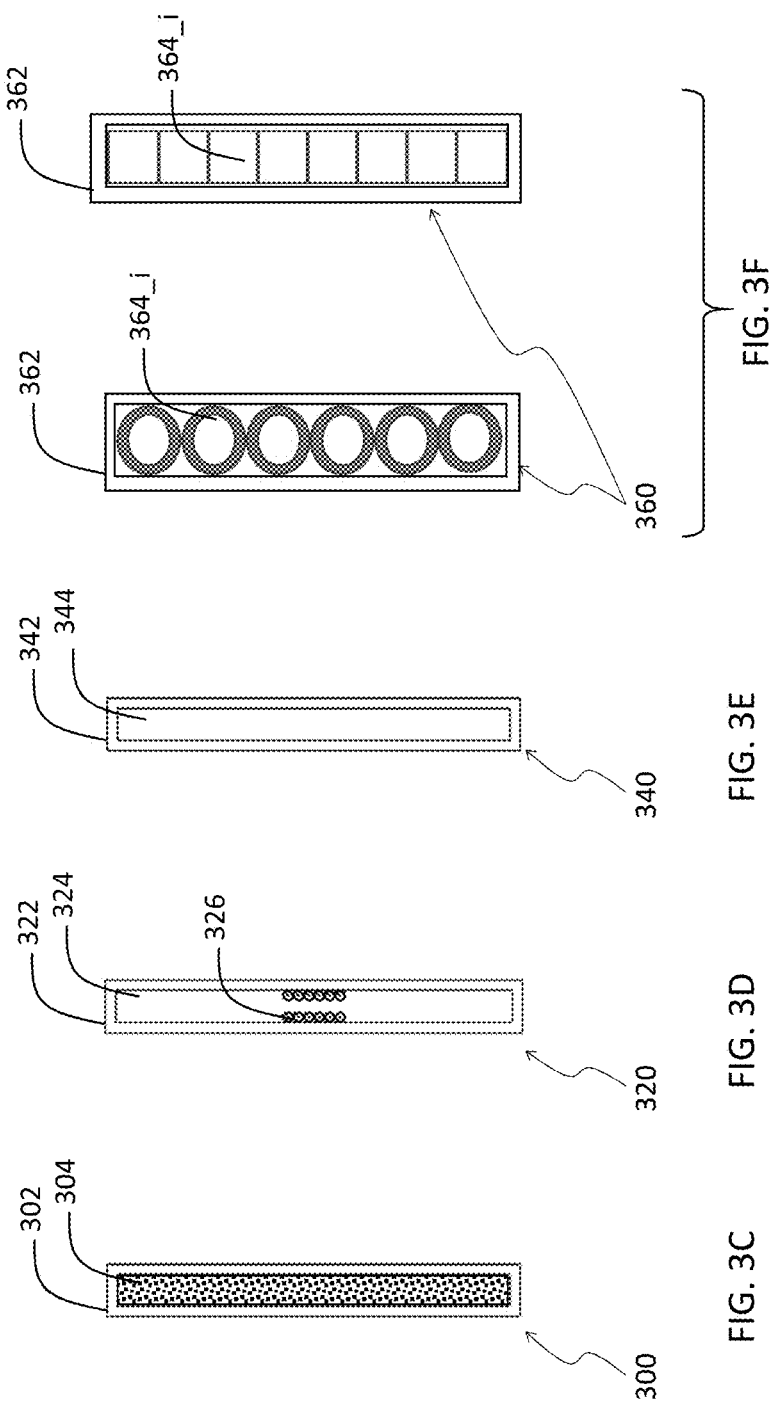

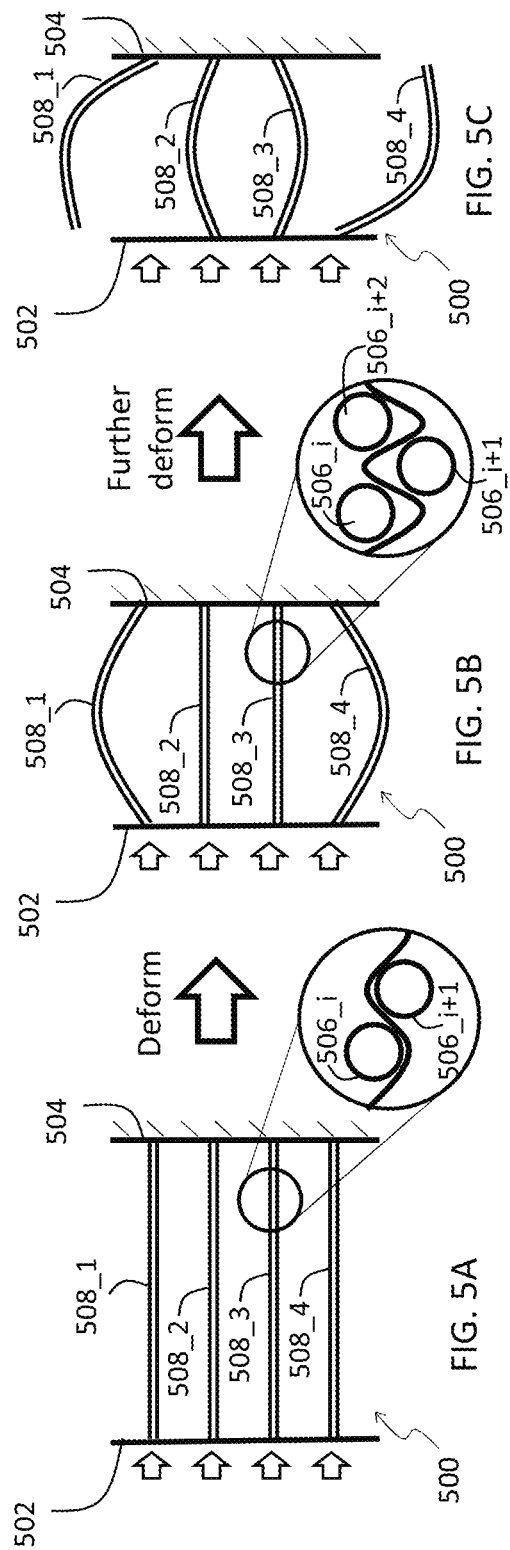

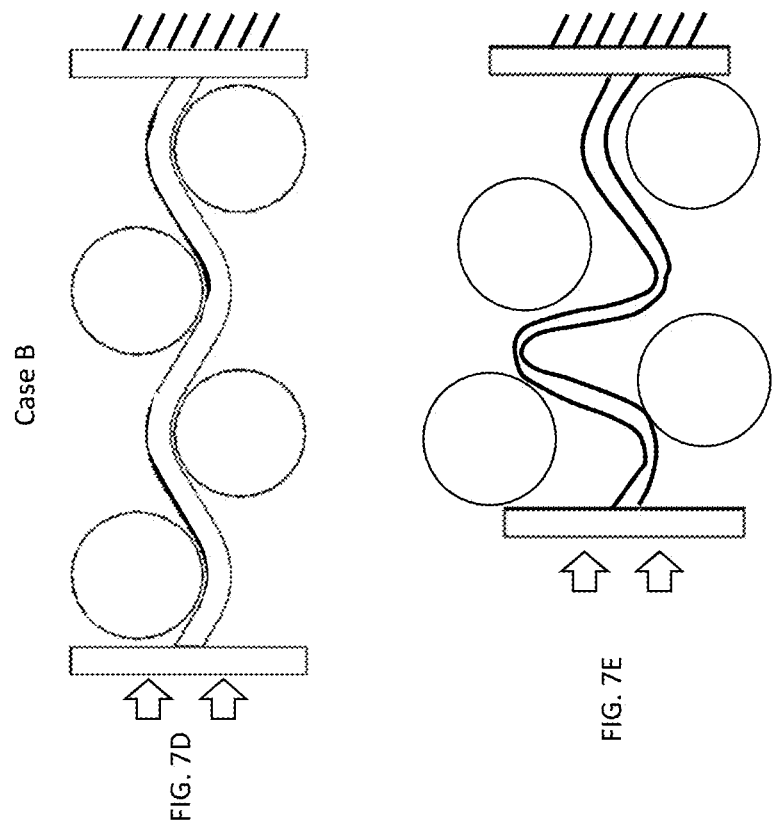
FIG. 7D
FIG. 7E
Case B
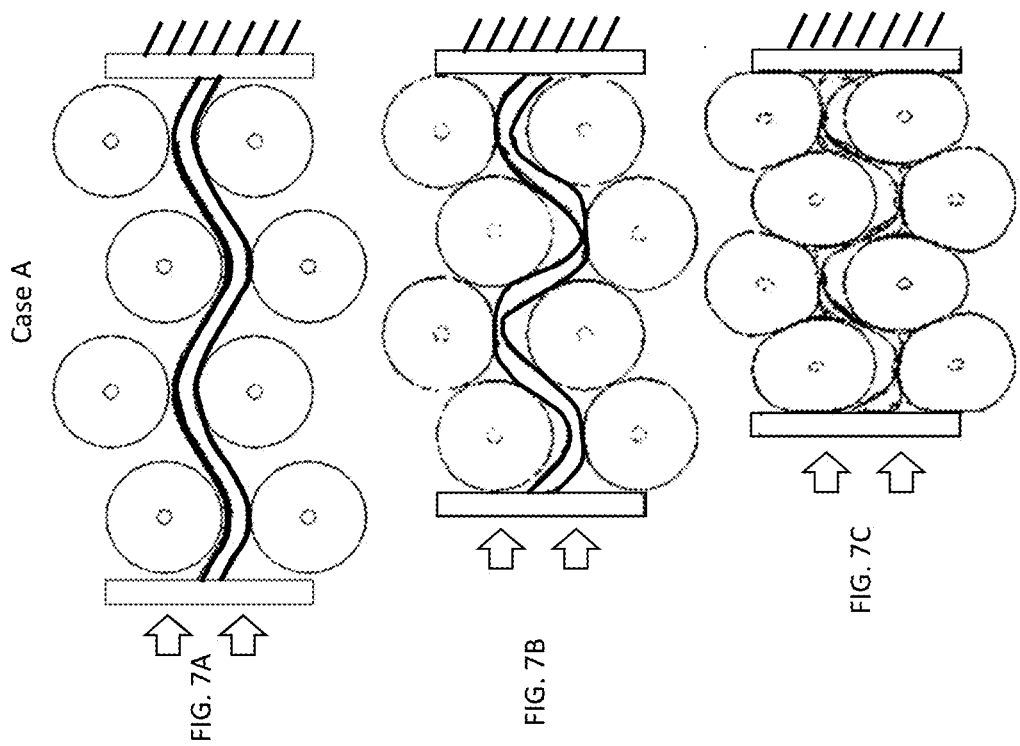
FIG. 7A
FIG. 7B
FIG. 7C
Case A

CRUSHABLE COOLING COLUMN FOR BATTERY ASSEMBLY IN ELECTRIC VEHICLE

CROSS-REFERENCE TO RELATED APPLICATIONS

The present patent application is related to and claims the priority benefit of U.S. Provisional Patent Application Ser. No. 62/466,166 filed Mar. 2, 2017 the contents of which is hereby incorporated by reference in its entirety into the present disclosure.

TECHNICAL FIELD

The present disclosure generally relates to impact absorbing arrangements and in particular to impact absorbing arrangements for batteries.

BACKGROUND

This section introduces aspects that may help facilitate a better understanding of the disclosure. Accordingly, these statements are to be read in this light and are not to be understood as admissions about what is or is not prior art.

In response to shortage of low cost fossil fuel and its constant price fluctuations, the automobile industry in the last decades has produced a large number of gasoline/electrical hybrid and fully electric vehicles. In either of these categories, a large battery pack is used to provide power to propel vehicles. The range of a vehicle running on such a battery pack depends on the capacity of the battery. Vehicles with larger battery packs are becoming more prevalent. In one such a vehicular application while the vehicle has the total body weight of 2000 kg, the battery weights 500 kg. That is, 25% of vehicle weight is used for the battery pack. However, these battery packs present challenges.

One such challenge is crashworthiness. A battery pack typically includes a plurality of cells. Nowadays lithium-ion battery technology is the technology of choice, while just as recent as a few years ago nickel metal hydride was most prevalent. While lithium-on battery packs provide a larger energy density, lithium-on packs are known to be unstable when subject to large impact forces. As a result, much effort has been placed in developing enclosures that protect the cells in the event of a collision. Exemplary enclosures of the prior art can be found in U.S. Pub. Pat. App. 20120160088 for Rawlinson, U.S. Pub. Pat. App. 20150155534 for Tsutsui et al., U.S. Pub. Pat. App. 20040069620 for Bitsche et al., U.S. Pub. Pat. App. 20080311468 for Hermann et al., and U.S. Pub. Pat. App. 20130004820 for Tennessen, each of which is incorporated by reference into the present disclosure in its entirety.

In addition, the batteries tend to fluctuate in temperature given their operational parameters. Once a cell becomes excessively hot, the cell often fails or becomes so degraded that it cannot provide electrical charge under normal conditions. To avoid this mode of failure, battery packs are often cooled as needed. However, the cooling packs add cost insofar as weight and volume.

Many of the enclosures that have been developed are bulky and add a considerable amount of weight to the vehicle, thereby negatively affecting the vehicle's range operating on the battery pack. Furthermore, current designs aim at protecting the battery pack during a vehicular crash. While a heavy battery pack may be protected, the occupants inside the vehicle may be subjected to more severe deceleration during a crash as a result of the conventional battery pack design.

Therefore, there is an unmet need for a novel battery packaging arrangement that can protect the battery during a crash, reduce deceleration, reduce weight, and cool the battery.

SUMMARY

A battery packaging arrangement is disclosed. The battery packaging arrangement includes a first base configured to be fixedly coupled to a frame of a vehicle, a second base moveable with respect to the first base, and a plurality of cooling columns inter-disposed between the first base and the second base. Each of the plurality of cooling columns includes a plurality of receiving surfaces for receiving a corresponding plurality of battery cells. Each of the plurality of cooling columns is further configured to deform when the second base in response to a force moves towards the first base.

A method of an absorbing impact force by a battery packaging arrangement is also disclosed. The method includes moving a first base in response to an impact force with respect to a second base which is configured to be fixedly coupled to a frame of a vehicle, and deforming a plurality of cooling columns inter-disposed between the first base and the second base in response to the impact force, each of the plurality of cooling columns includes a plurality of receiving surfaces for receiving a corresponding plurality of battery cells.

BRIEF DESCRIPTION OF DRAWINGS

FIG. 3B is a perspective view of the cooling column of FIG. 3A and a plurality of battery cells disposed thereabout.

FIGS. 3C, 3D, 3E, and 3F provide cutouts of the cooling column according to different embodiments of the present disclosure.

FIGS. 5A, 5B, and 5C are schematic views of the battery pack of the present disclosure during a deformation event.

FIGS. 7A, 7B, and 7C are schematic views of the battery pack of the present disclosure during a deformation event according to a first arrangement.

FIGS. 7D and 7E are schematic views of the battery pack of the present disclosure during a deformation event according to a second arrangement.

DETAILED DESCRIPTION

Figure 1:
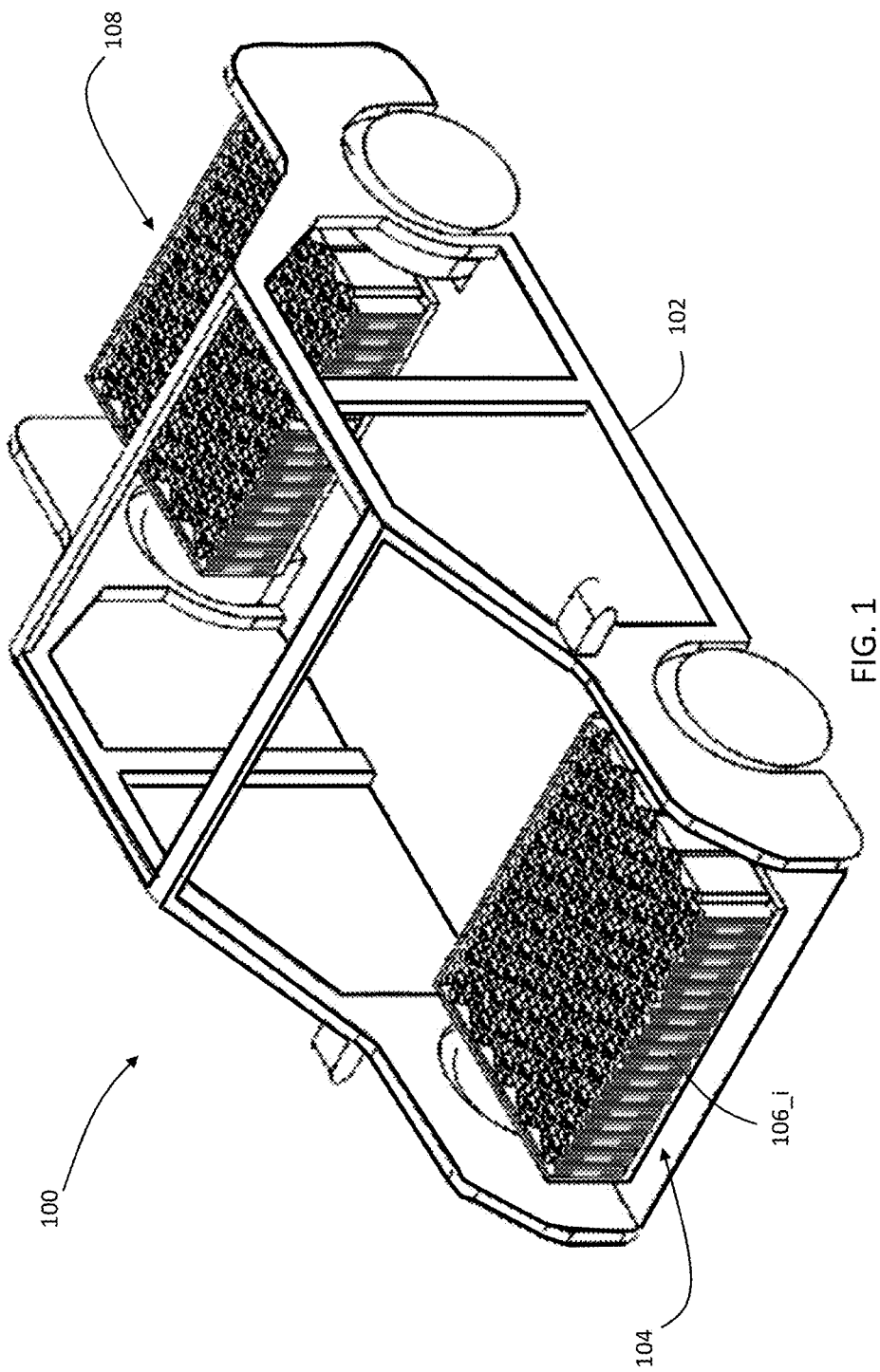
FIG. 1 is a perspective drawing of a vehicle frame showing two battery pack arrangements according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

In the present disclosure, a novel battery packaging arrangement is presented that can protect the battery during a crash, reduce deceleration, reduce overall weight of the vehicle, and provide thermal management for the battery.

Referring to FIG. 1, an exemplary embodiment of a novel battery packaging arrangement described in the present disclosure is shown in a vehicular application. A vehicle 100 is shown with two battery packs 104 and 108, one in the front and one in the rear of the vehicle 100. Each battery pack includes a plurality of battery cell 106_$i$ disposed in a tightly arrangement of the battery packs 104 and 108. The vehicle is further defined by a frame 102 which provides support for the battery packs 104 and 108. In each of the two battery packs 104 and 108 are included other structures associated with the present disclosure, described more fully below.

Figure 2:
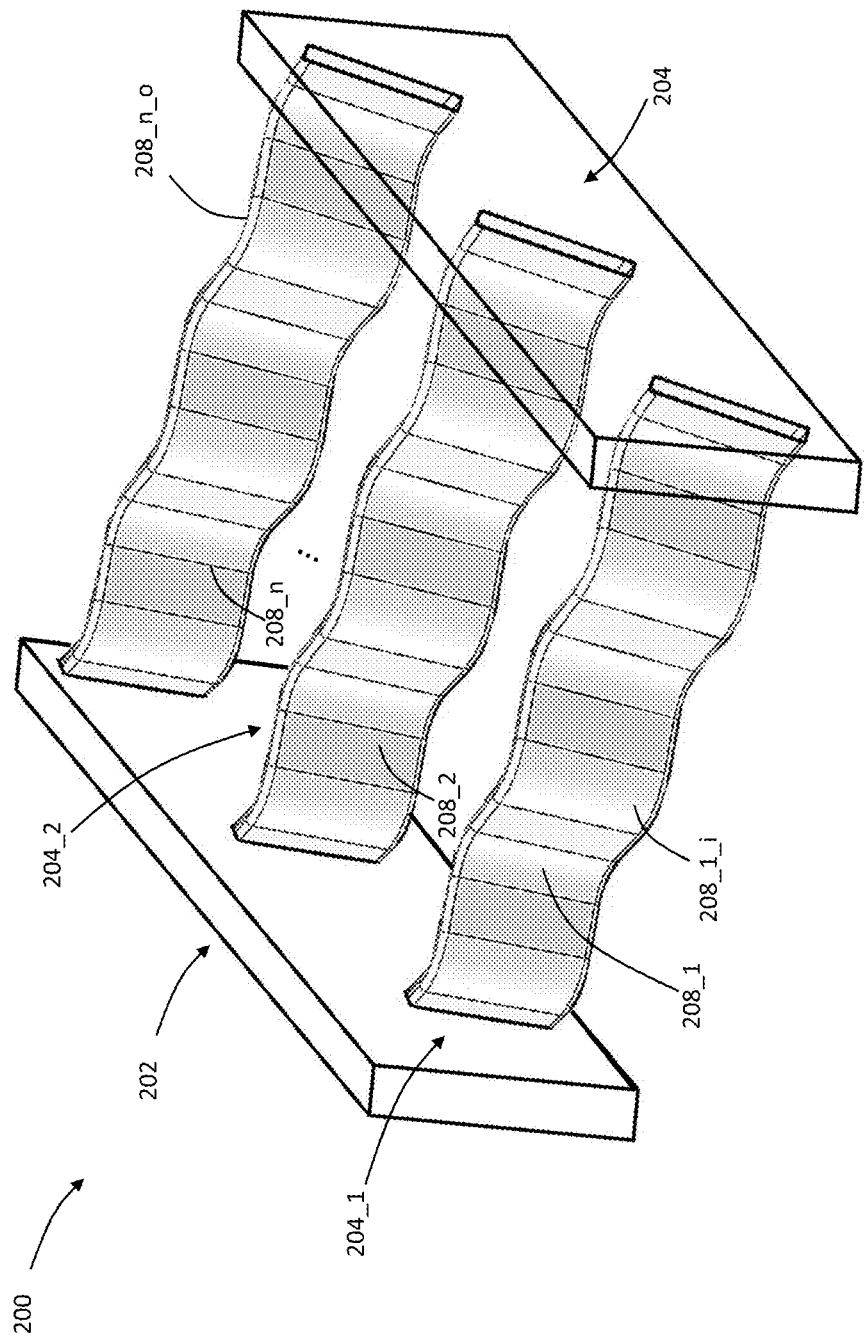
FIG. 2 is a schematic of an exemplary embodiment of the battery packaging arrangement according to the present disclosure, including two bases and multiple cooling columns inter-disposed therebetween.

Referring to FIG. 2, an exemplary embodiment of the battery packaging arrangement 200 according to the present disclosure is shown. The battery packaging arrangement 200 includes a plurality of cooling columns 208_1, 208_2 . . . 208_$n$ (three are shown, however, the number of cooling columns is established based on the size of the battery pack and it may range from 2 to 100). Included in the battery packaging arrangement 100 are also bases (or also referred to as ends) 202 and 204. These bases 202 and 204 are disposed at the end of each of the cooling column 208_1, 208_2 . . . 208_$n$ and are fluidly coupled therewith. Each base 202 and 204 provides recirculating cooling fluid through each cooling column 208_1, 208_2 . . . 208_$n$ and further provides a rigid structure therefor. As will be discussed infra, the cooling columns 208_1, 208_2 . . . 208_$n$ allow flow of a coolant fluid which can be gas or liquid and where the columns are coupled to each other in a combination of parallel and serial connectivity. The bases 202 and 204 can be hollow with separators (not shown) for providing the desired parallel/series connectivity between the cooling columns 208_1, 208_2 . . . 208_$n$. Each cooling column includes an inner side (e.g., 208_1_$i$) and an outer side (e.g., 208_$n$_$o$) and is further shaped to include a sequential plurality of alternating concave and convex surfaces on each side. Each concave surface is configured to receive a battery cell, as further discussed below.

Figure 3A:
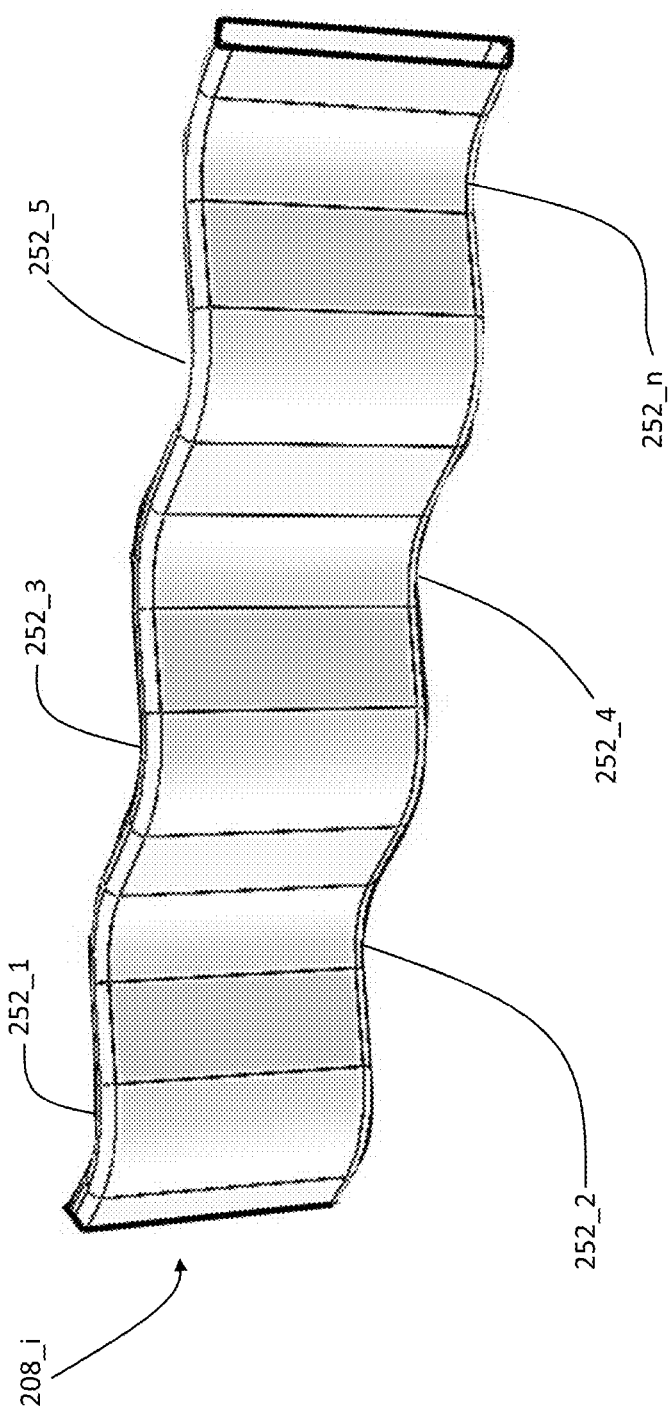
FIG. 3A is a perspective view of a cooling column shown in FIG. 2.

Referring to FIG. 3A, a single cooling column 208_$i$ is depicted as configured to house a plurality of battery cells. The wave-like surface (representing alternating concave and convex surfaces) of the cooling column 208_$i$ provides concave surfaces for these battery cells. In the exemplary embodiment of FIG. 3A, the cooling column 208_$i$ is configured to house six battery cells (see FIG. 3B depicting a perspective view of a six-cell configuration with one cooling column). However, the number of battery cells can be from 1 to as many as 500. In FIG. 3A, six concave surfaces are shown as receiving surfaces 252_1, . . . 252_$n$ to receive the battery cells. Dimensional characteristics of each receiving surface 252_1, . . . 252_$n$ is fully described below.

Referring to FIG. 3B, an exemplary cooling column 208_$i$ is shown with each of the receiving surfaces (not identified) receiving a battery 262_1 . . . 262_$n$.

The cooling column 208_$i$ is hollow in construction designed for allowing passage and flow of a fluid therethrough. Referring to FIGS. 3C, 3D, 3E, and 3F different exemplary embodiments are provided. With reference to FIG. 3C, an embodiment of a cooling column 300 with a hollow rectangular cross section 302 is depicted adapted for passing of a coolant liquid 304. Referring to FIG. 3D, another embodiment of a cooling column 320 is depicted again with a rectangular cross section 322 with a hollow space 324 with a plurality of tubes 326 disposed in the rectangular cross section 322 which are adapted to pass coolant fluid therethrough. Referring to FIG. 3E, another embodiment of a cooling column 340 is depicted which has a similar rectangular cross section 342 structure as that depicted as in FIG. 3C, however, is adapted to pass a coolant gas 344 or other gases therethrough. Finally, referring to FIG. 3F, yet another embodiment of a cooling column 360 is depicted in which a rectangular cross section 362 is made of tangentially coupled tubes 364_$i$ (cylindrical or square) adapted to pass a coolant gas or fluid therethrough. In all these embodiments the shape of the cross-sectional area is not limited to a rectangle. The rectangular shape is provided as an example, however, other shapes such as oval, are possible and within the scope of the present disclosure.

Figure 4B:
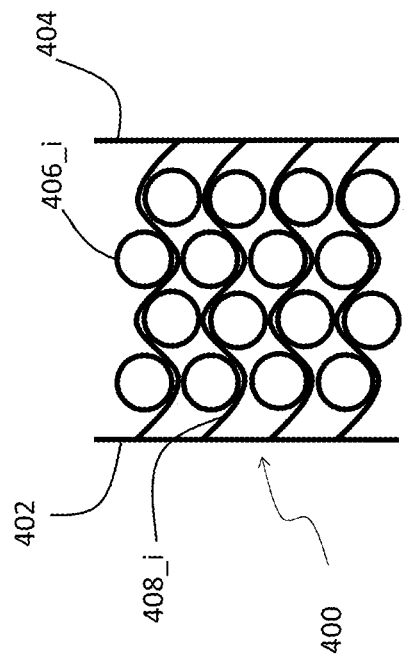
FIG. 4B is a schematic top view of the batter pack of FIG. 1.
Figure 4A:
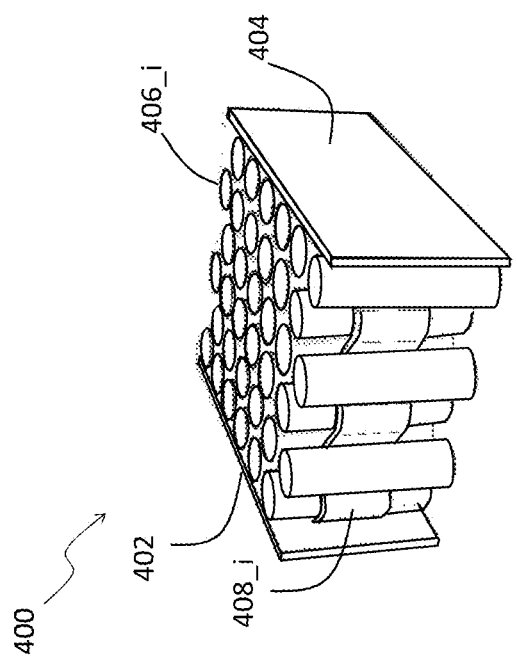
FIG. 4A is a perspective views of a battery pack shown in FIG. 1.

Referring to FIGS. 4A and 4B, a perspective view and a top (or bottom) schematic view of a battery pack 400 including a plurality of battery cells 406_$i$ disposed in between a plurality of cooling columns 408_$i$ are depicted (only one cooling column 408_$i$ is shown in FIG. 4A), disposed between bases 402 and 404. As discussed supra, the cooling columns 408_$i$ are terminated at the bases 402 and 404 where cooling fluid is supplied to each of the cooling columns 408_$i$. While only two bases 402 and 404 are shown, it should be appreciated that more than two bases are within the scope of the present disclosure by repeating the battery packs 400 side-by-side to make larger battery packs where neighboring battery packs 400 share the same bases or have separate bases.

Figure 4D:
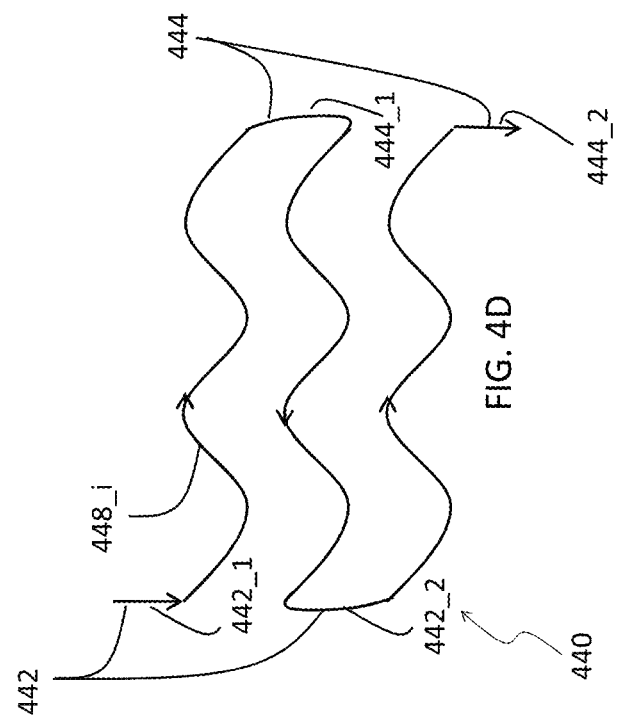
FIGS. 4C and 4D are schematic views of the fluid flow between the bases and the cooling columns inter-disposed therebetween for a parallel combination (FIG. 4C) and a series combination (FIG. 4D).
Figure 4C:
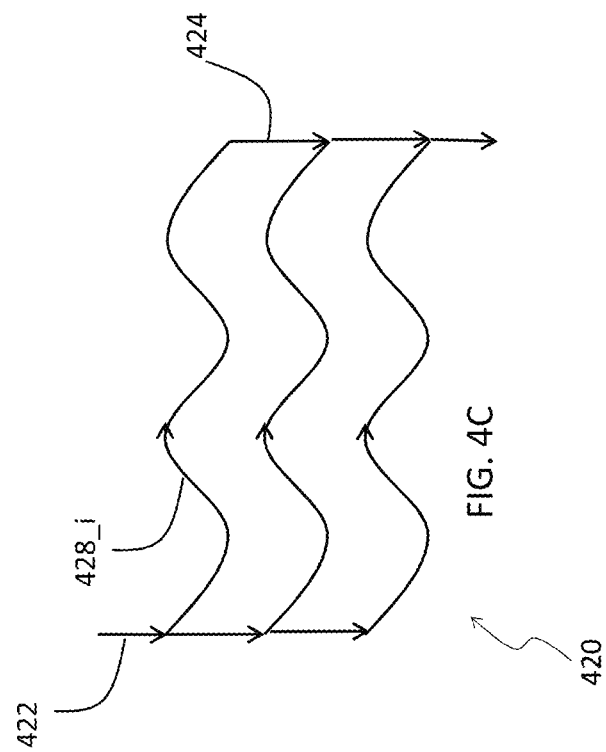

Referring to FIGS. 4C and 4D, flow schematics of two different embodiments of the fluid flow according to the present disclosure are provided. With reference to FIG. 4C, a parallel configuration 420 is shown including bases 422 and 424 and cooling columns 428_i (three shown) disposed therebetween. With respect to FIG. 4C, temperature of fluid at each base 422 and 424 of the plurality of cooling column 428_i is substantially the same. That is the temperature on the left base 422 is substantially the same, while the temperature on the right base 424 is substantially the same. The arrangement 420 in FIG. 4C is considered to be a parallel arrangement, similar to a parallel electrical circuit with temperature of the fluid (not called out) representing electrical voltage and heat flow through each cooling column 428_i, represented by the arrows, representing electrical current. In this analogy, the voltage across each branch is substantially equal. Similarly, the temperature drop (in the analogy the voltage drop) across each cooling column 428_i is also substantially equal.

Conversely, with reference to FIG. 4D, a series configuration 440 is shown including bases 442 and 444 and cooling columns 448_i (three shown) disposed therebetween. The same analogy to an electrical circuit can be made where the temperature at the left base 442 is different at different spots. For example, the temperature at the top portion of the left base 442 identified by the reference numeral 442_1 is higher than the temperature at the bottom portion of the left base 442 identified by the reference numeral 442_2 i, resulting in a temperature gradient across the left base 442 and thus across different cooling columns 408_i. Similarly, the temperature at the top portion of the right base 444 identified by the reference numeral 444_1 is higher than the temperature at the bottom portion of the right base 444 identified by the reference numeral 444_2i, resulting in a temperature gradient across the right base 444 and thus across different cooling columns 408_i. While in the above analogies temperature has been associated with electrical voltage and heat flow associated with electrical current, a similar analogy can also be made for pressure and fluid flow, respectively. Therefore, with reference to FIG. 4C, in the parallel configuration 420 pressure of fluid at each base 422 and 424 of the plurality of cooling columns 428_i is substantially the same, whereas with reference to FIG. 4D, in the series configuration 440 there is a pressure gradient of fluid at each base 442 and 444 of the plurality of cooling columns 448_i.

While the cooling columns (e.g., 208_i in FIG. 3A) provide a function of cooling the battery cells, the cooling columns also provide a predetermined path of deformation during a crash, thereby providing multiple functions. Referring to FIGS. 5A, 5B, and 5C, schematics of a battery packaging arrangement 500, according to the present disclosure, is presented in progressive deformation, respectively. The battery packaging arrangement 500 includes two bases 502 and 504, one of which is an immovable base—here the right base 504 is the immovable base identified with diagonal dashed lines as compared to the other which is a moveable base—here the left base 502. The battery packaging arrangement 500 further includes a plurality of cooling columns 508_i and a plurality of battery cells 506_i inter-disposed therein. FIG. 5A is a schematic depicting four cooling columns 508_1, 508_2, 508_3, and 508_4 as forces from an impact (characterized as double arrows on the left) are just beginning to impart on the moveable base 502. FIG. 5B, represents an initial deformation where the inner two cooling columns 508_2 and 508_3 are squeezed (similar to an accordion) while the outer two cooling columns are deforming out of the envelope defined by the bases 502 and 504. In doing so, the cooling columns 508_2 and 508_3 deform and bring their respective battery cells (506_i, 506_i+1 and 506_i+2) closer to each other as compared to the undeformed state. Finally, FIG. 5C represents a further deformation state where the outer two cooling columns 508_1 and 508_4 have disengaged from the bases, and thereby release their respective battery cells 506_i out of the envelope defined by the bases 502 and 504. Also, the two inner cooling columns 508_2 and 508_3 have further deformed in a vertical direction which occurs once these cooling columns have been squeezed to a limit defined by the position of the battery cells 506_i with respect to each other (i.e., when the battery cell are in such proximity to each other such that they can no longer be squeezed closer). These deformations allow absorption of energy in a crash thereby reducing the deceleration. The increased curvature of cooling columns 508_i will also push surrounding batteries sideways. This deformation action will increase the deformable volume, comparing to prior art assemblies with an all-sides rigid enclosure. Thus, it can decrease equivalent volumetric strain of the assembly and decrease total impact force level. As a result, the occupants inside a vehicle using this concept will experience smaller deceleration.

According to one embodiment of the present disclosure, the deformation of the cooling columns, e.g., 508_1 . . . 508_4, is reversible prior to a threshold. For example, the deformation seen in transition from FIG. 5A to 5B may be reversible. That is in situations where the impact force is sufficiently low, the cooling columns 508_1 . . . 508_4 may be configured to squeeze in the manner described above, however, be configured to return to their original disposition once the impact forces have been removed. In this configuration, however, once the threshold is met Referring to FIG. 6, a schematic is provided showing various dimensions important in the present disclosure. It should be, however, noted that there are many parameters in this design. The parameters shown are only a few that can be optimized for certain applications to find a balance between: (a) high impact energy absorption capability, (b) low maximum force transmitted to vehicle, (c) high electrical energy density, and (d) low weight. For global geometry, five parameters are shown (W, $D_0$, $D_b$, H, and $\theta$) for alterations in different designs. These parameters are defined below.

W represents half of the horizontal distance between the center of axes of two neighboring battery cells. Using W, the total horizontal length of one column can be calculated by the following equation: Total horizontal length=$(n-1)\cdot 2W + D_b$, where n is the number of cells in one column, $D_b$ is the diameter of a battery cell;

$D_0$ represents the diameter of the cylindrical battery cell plus the width of the cooling column.

That is, $D_0 = D_b + t$, where t is the thickness of the cooling column;

H represents half of the vertical distance between the center of axes of two neighboring battery cells; and $\theta$ represents half of angle where the cylindrical battery in contact with cooling column. That is, total contact angle between the cooling column and battery cell is $2\theta$. In one configuration, energy cell volumetric density is 58.6% (example #1). If PANASONIC® NCR18650A battery is used, the energy density can achieve 382.4 Wh/L.

Figure 6:
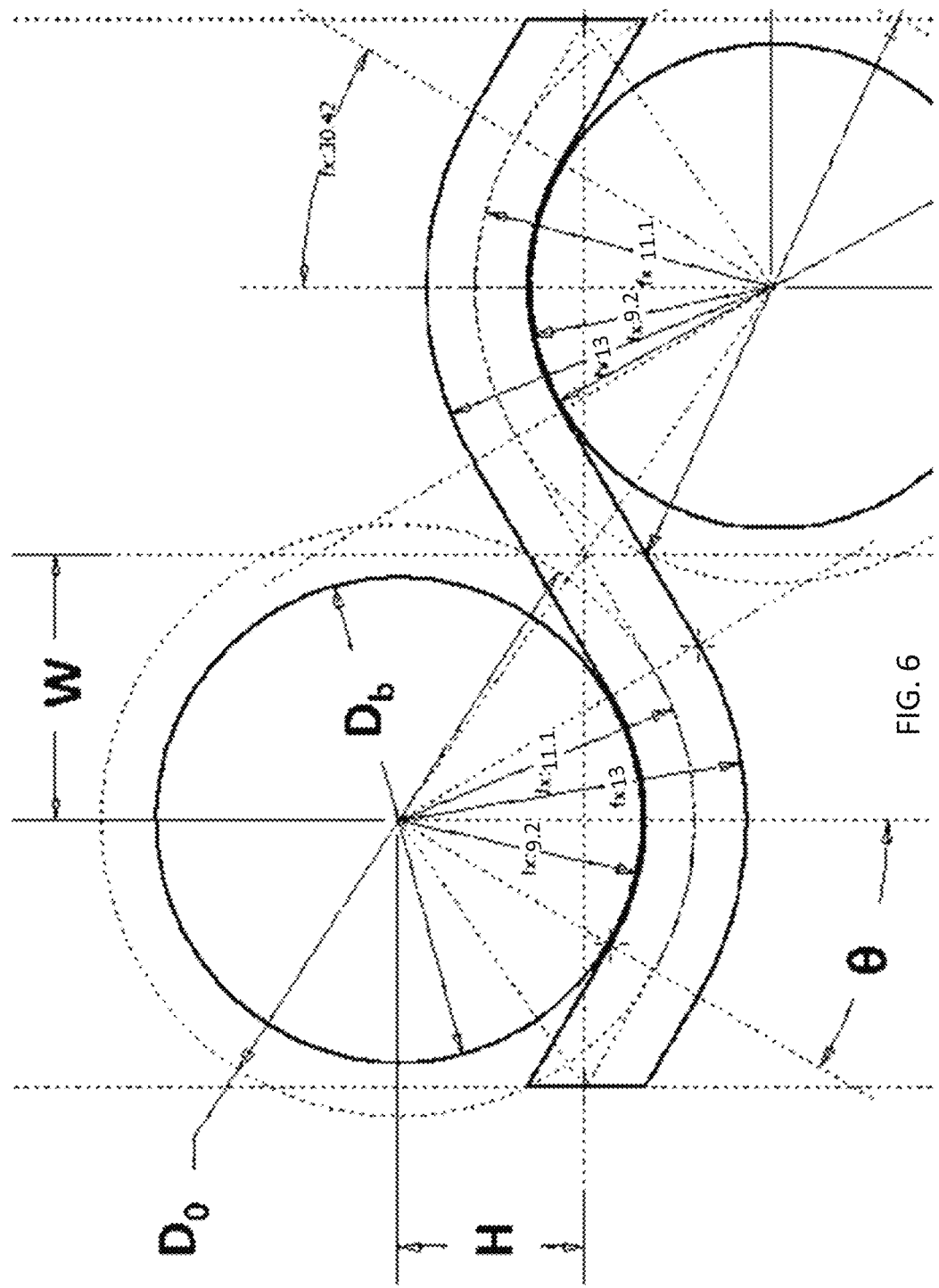
FIG. 6 is a graphical representation of various parameters important in the design of the present battery pack of the present disclosure.

In FIG. 6, W has a minimum dimension of 4.5 mm. There is no limitation for a maximum W, although the W dimension being too large means that a battery pack's energy density is too low since there is not enough battery cells in the pack. The $D_0$ dimension depends on diameter of the battery cell. If the 18650 cell is used, the $D_0$ dimension is 18 mm+½ of cooling column thickness. Thus, based on the minimum of maximum specified in Item 4 (that are 0.5 mm and 6.0 mm), the minimum and maximum $D_0$ dimensions are about 18.25 (=18 mm+0.5 mm/2) mm and about 21.0 mm (=18 mm+6.0 mm/3), respectively. There is no limitation on the $D_b$ dimension. For instance, an 18650 cell has the Db dimension of 18.0 mm and VL6P cell by Saft/Johnson Controls has the Db dimension of 38 mm. The largest-diameter mass-produced lithium-ion cell of which we are aware is VL41M cell by Saft/Johnson Controls with the $D_b$ dimension of about 54.3 mm. Thus, if we are to put the range to the $D_b$ dimension for the currently available cylindrical lithium-ion battery cells, the maximum and minimum $D_b$ dimensions are 18.0 mm and 54.3 mm, respectively. The H dimension depends on the diameter of the cylindrical cell as well. The range of this dimension is calculated has the following constraints:

$$\frac{D_b + t\_min}{2\sqrt{2}} \leq H \leq \frac{D_b + t\_max}{2},$$

where
$D_b$ is the diameter of a battery cell,
t_min is the minimum thickness of the cooling column, and
t_max is the maximum thickness of the cooling column. If this equation is applied to the 18650 cell (with $D_b$=18.0 mm, t_min=0.5 mm, and t_max=6.0 mm, the minimum and maximum dimensions are 6.5 mm and 12.0 mm, respectively. The θ angle changes the contact surface between the battery cell and cooling column. The minimum θ is 0 deg, but this provides a straight cooling column with battery cells touching each other; thus, the contact between the battery cell and the cooling column is a point in 2D and a line in 3D. Furthermore, the kinetic energy dissipation is done by the permanent deformation of the battery cells, rather than by the cooling columns, so the cooling column does not work as a kinetic energy dissipation device. On the other hand, the maximum θ is 45 deg. This provides the maximum contact surface between the battery cells and cooling columns.

Referring to FIGS. 7A, 7B, and 7C, schematics of a battery packaging arrangement according to one exemplary embodiment of the present disclosure is shown when one side is subjected to an impact while the other side is considered fixed (Case A). Referring to FIGS. 7D and 7E, schematics of a battery packaging arrangement according to another exemplary embodiment of the present disclosure is shown when one side is subjected to an impact while the other side is considered fixed (Case B). In the embodiment of FIGS. 7A through 7C, the volumetric density of battery cells is higher (as compared to the embodiment shown in FIGS. 7D and 7E). As a result, while the cooling column begins to deform plastically, the battery cells come into contact (see FIG. 7B). Continued deformation results in deformation of the battery cells (see FIG. 7C). Cells from the adjacent cooling columns are not shown, but it should be noted that the increased volumetric density works to also make contact between cells across and about neighboring cooling columns, as will be discussed below with reference to FIG. 9A. Conversely, as shown in FIGS. 7D and 7E, due to the decreased volumetric density, the cells are pushed out rather than come into contact with each other along one cooling column.

Utilizing finite element analysis, these two cases (Case A and Case B) are analyzed. In Case A, one crushable cooling column is surrounded by eight battery cells, where each battery cell is fixed in transverse directions while free to move in the loading direction. This case is to analyze the mechanical properties of assembly with infinite many columns in transverse direction (where lateral deformation is minimum). In Case B, one crushable cooling column surrounded by four battery cells, where the battery cells are free to move in all directions. This case is to analyze the mechanical properties of assembly with just one crushable cooling column. The mechanical response of a battery pack should fall in a range as defined between Case A and Case B. Referring to FIG. 7B, at the moment the batteries begin to make contact represents a situation where corresponding nominal (global) strain is defined to analytical critical compression strain with limited loads from the battery cells. Before this moment, the only load transfer to each battery cell is from the plastically deforming cooling column, which is relatively small as compared to loading by adjacent battery cells. After this moment (FIG. 7C), the battery cells are loaded by both cooling column and adjacent battery cells, which is the same as the case where direct-compression of battery cells occurs. As a result, the total force of assembly is expected to increase dramatically. This critical compression strain depends on battery assembly design, and can be calculated by the following equation:

$$\varepsilon_{cr} = 1 - \frac{\sqrt{D_b^2 - \min\{(2H)^2, (D_0 - 2H)^2\}}}{2W}$$

based on the variables shown in FIG. 6.

Figure 8:
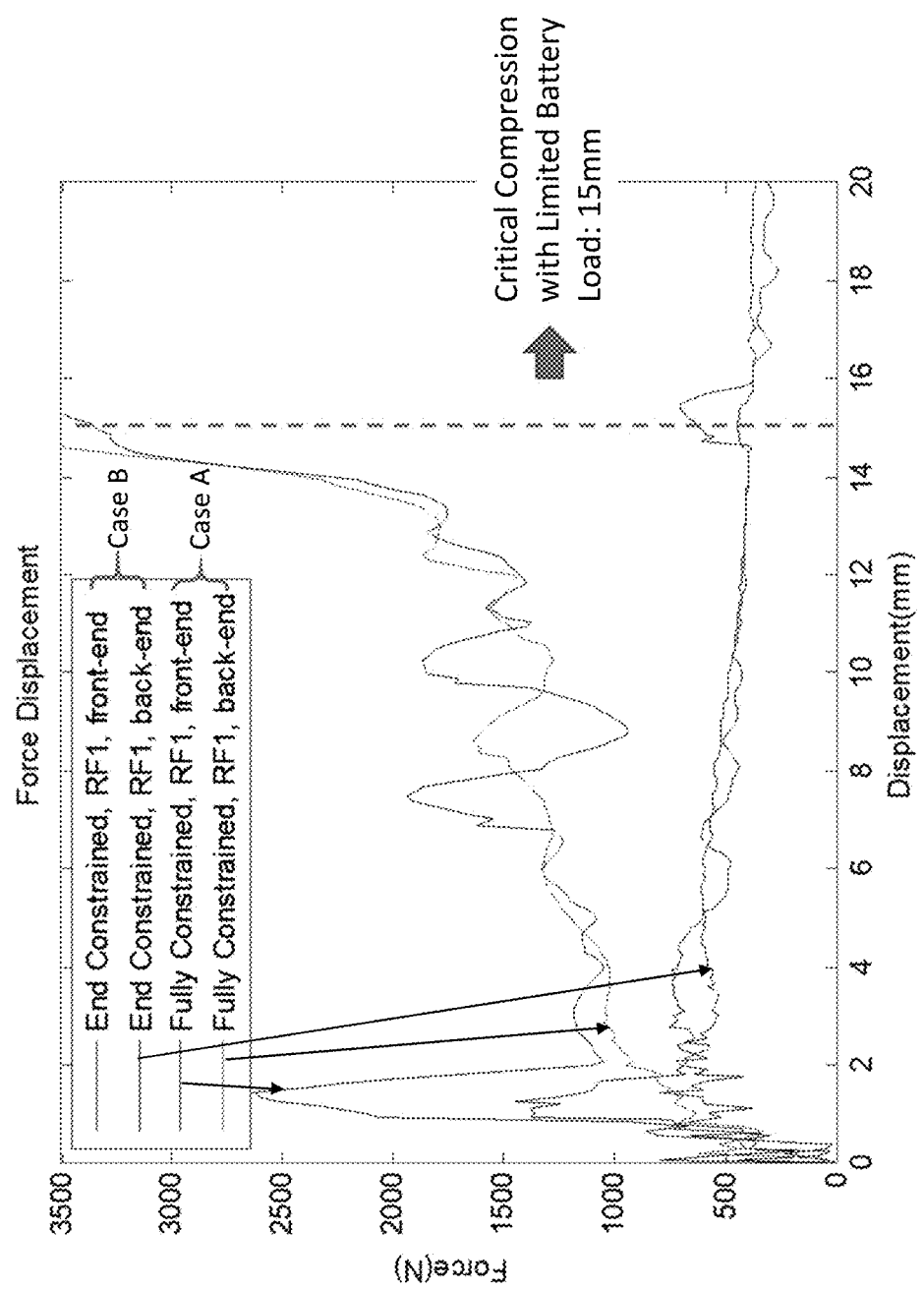
FIG. 8 is a graph of force (measured in N) vs. displacement (measured in mm) for the first and second arrangements of FIGS. 7A, 7B, 7C, and 7D, 7E, respectively.

Referring to FIG. 8, a graph of force measured in N vs. displacement measured in mm is shown. Front end forces are recorded on the impact end, and back end force are recorded on fixed end (with the diagonal hash marks, as shown in FIGS. 7A-7E). The results indicate for both Cases A and B, front end forces have higher amplitude in the beginning of the impact than back end force, which is due to dynamic wave propagation; but these two gradually overlap with each other, which indicates a sign of equilibrium. The result shows Case A generally has higher force levels as compared to Case B under substantially the same displacement. The force levels of Case A increase about analytical critical compression point.

Figure 9C:
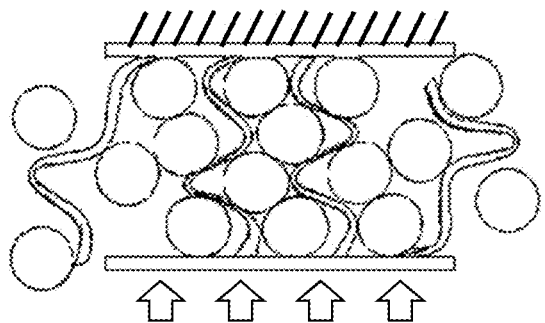
FIG. 9C is another schematic view of the battery pack of the present disclosure during a deformation event according to a first arrangement including multiple cooling columns.
Figure 9B:
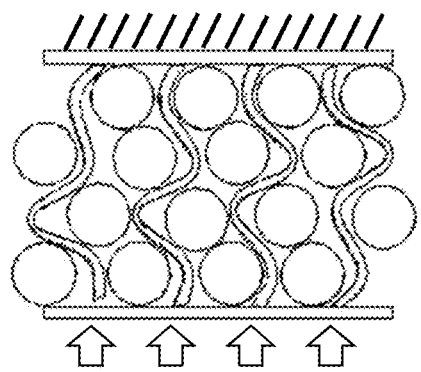
FIGS. 9A and 9B are schematic views of the battery pack of the present disclosure during a deformation event according to a first arrangement including multiple cooling columns.
Figure 9A:
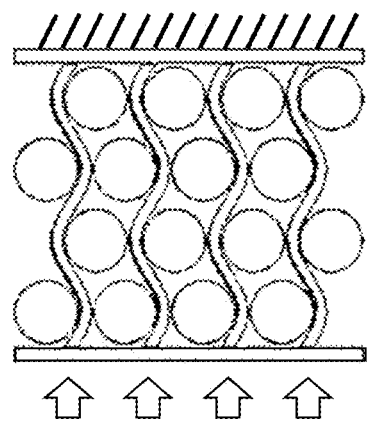
Figure 10C:
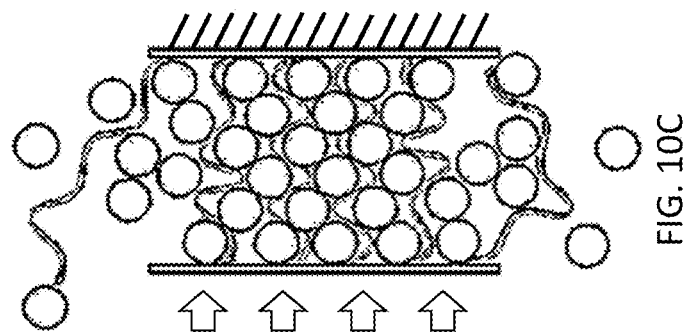
FIGS. 10A, 10B, and 10C are schematic views of the battery pack of the present disclosure during a deformation event according to a 6*6 matrix of cells.
Figure 10B:
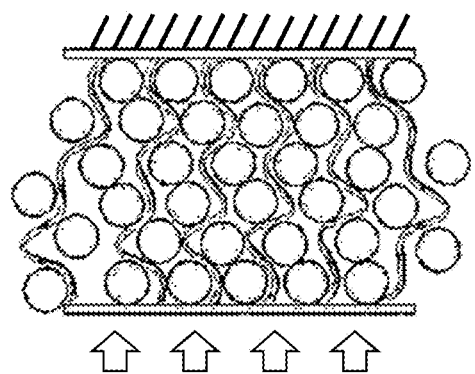
Figure 10A:
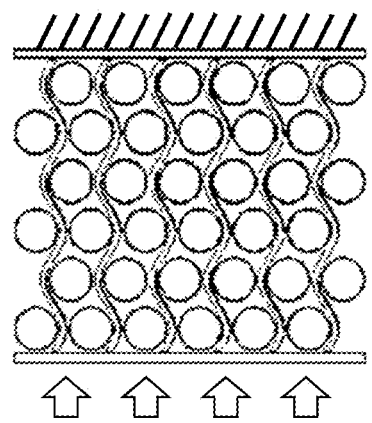
Figure 11C:
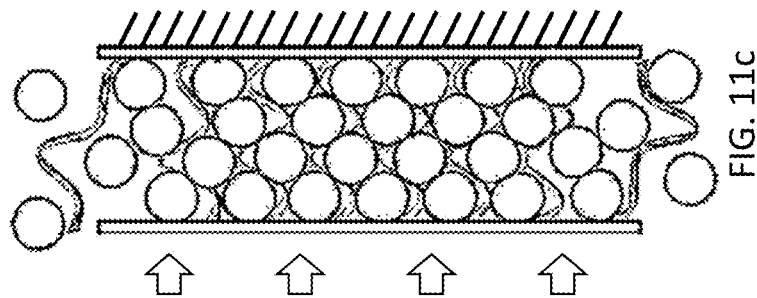
FIGS. 11A, 11B, and 11C are schematic views of the battery pack of the present disclosure during a deformation event according to a 8*4 matrix of cells.
Figure 11B:
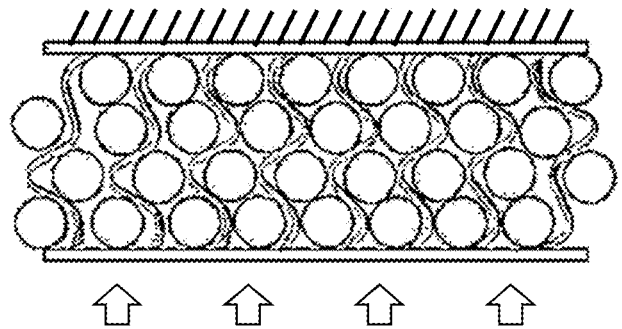
Figure 11A:
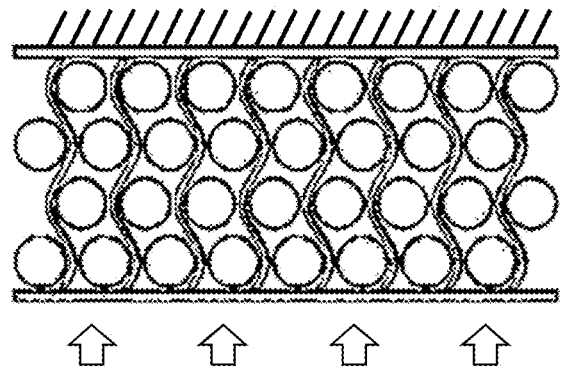
Figure 12:
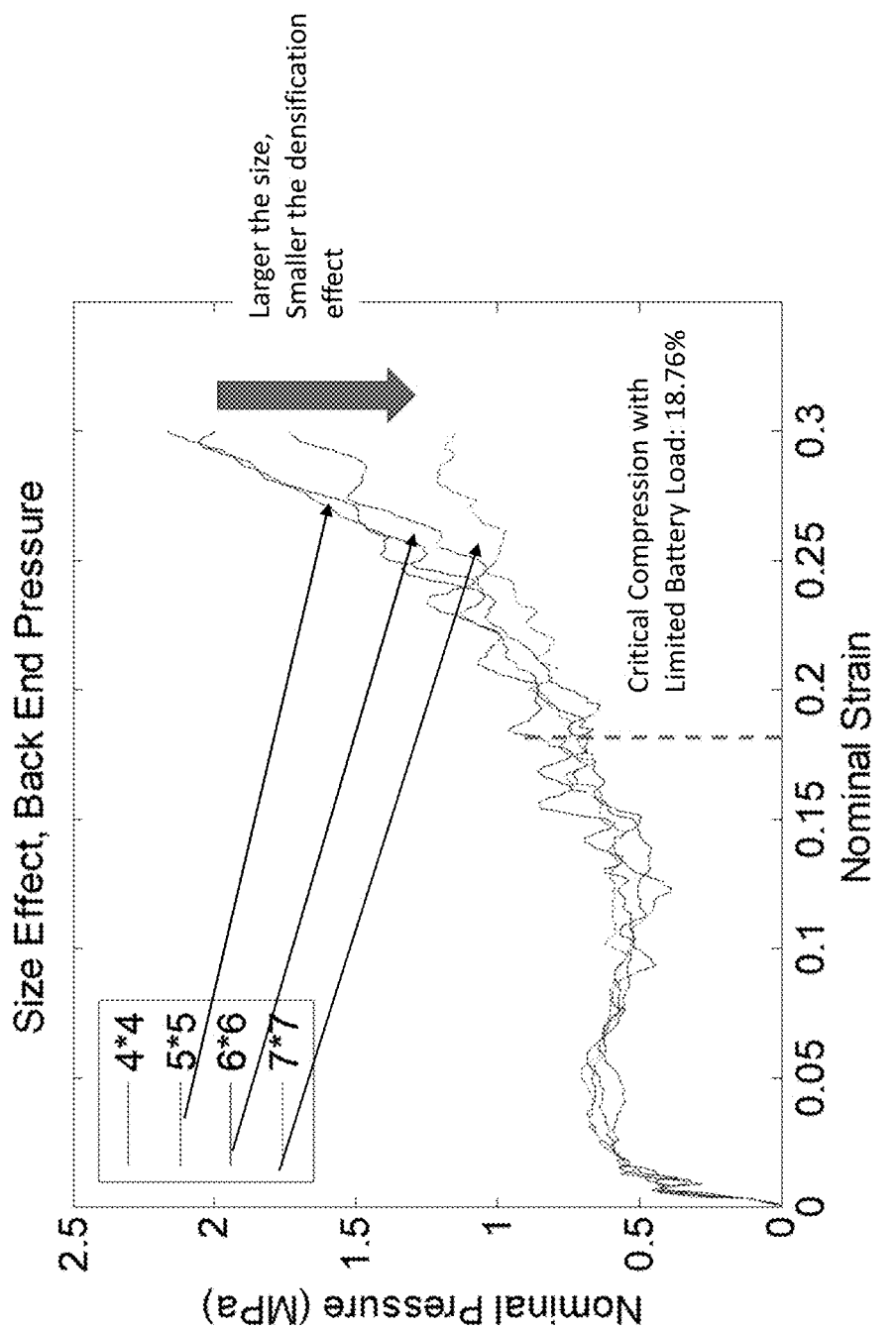
FIG. 12 is a graph of force (measured in N) vs. displacement (measured in mm) for the 4*4, 5*5, 6*6, and 7*7 matrix cases.

While the results provided in FIG. 8 are for one cooling column, a similar study was carried out for multiple cooling columns as shown in FIGS. 9A through 9C. Referring to FIGS. 9A, 9B, and 9C, schematics of a battery packaging arrangement according to one exemplary embodiment of the present disclosure is shown when one side is subjected to an impact while the other side is considered fixed. In the embodiment of FIGS. 9A through 9C, the volumetric density of battery cells is such that while the cooling columns begin to deform plastically, the battery cells come into contact (see FIG. 9B) with each other in some instances and in some instances are released beyond the boundaries of the envelope defined by the bases. Continued deformation results in deformation of the battery cells (see FIG. 9C). FIGS. 9A-9C represent a 4*4 matrix of cells through plastic deformation. FIGS. 10A-10C represent a 6*6 matrix of cells through plastic deformation. FIG. 11A-11C represent an 8*4 matrix of cells through plastic deformation. Referring to FIG. 12 a nominal pressure (MPa) vs. normal strain is depicted for different configurations (4*4, 5*5, 6*6, and 7*7 matrixes). The vertical order of the curves provided are the same as what is shown in the legends. Normal strain is the displacement divided by original length; and nominal pressure is the force divided by original area. All pressure-strain curves start with a rising segment, followed by a yielding behavior, and then followed by a densification behavior. From results, the nominal pressures of the rising part and yielding behavior from different sizes are substantially the same. The data shown here can be scaled up.

The energy absorption is proportional to the area under the curve. For a given energy absorption requirement, it is desired to lower the maximum force (pressure). Thus, it is desired to have a long and flat yielding region (otherwise referred to as the plateau region) for better efficiency.

After the critical compression point, the strain-pressure curves start to diverge. The larger size has lower pressure, which has better energy absorption efficiency.

Figure 13:
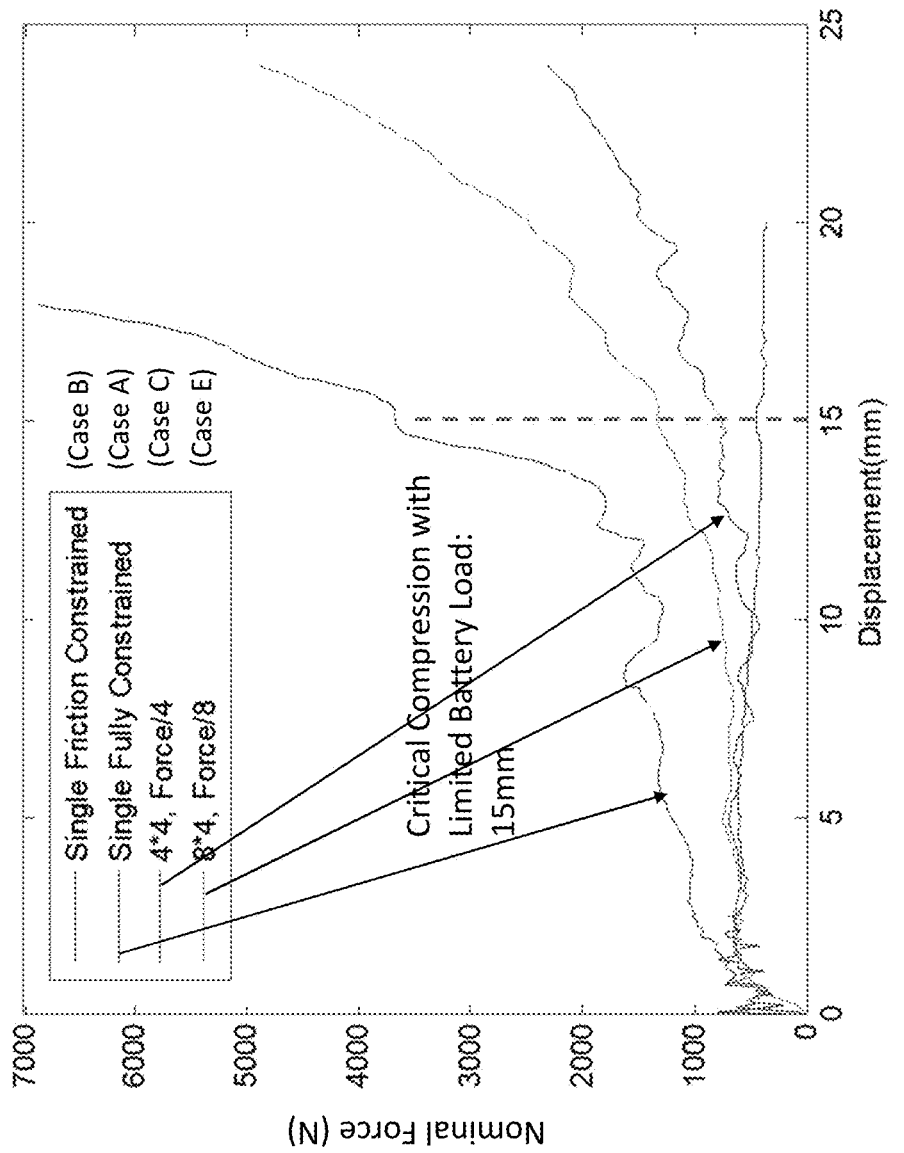
FIG. 13 is a graph of force (measured in N) vs. displacement (measured in mm) for the 4*4, 8*8 matrix cases as well as other constraint cases.

Referring to FIG. 13, curves for a nominal force (N) vs. displacement (mm) similar to that shown in FIG. 8 are shown. There are two cases: The first case, single fully constraint, is depicted in FIGS. 7A, 7B, and 7C, where battery cells are fully constrained in the vertical direction (i.e., transverse to the loading direction); thus, the battery cells move only to in the horizontal direction. The second case, single friction constraint, is depicted in FIGS. 7D and 7E, where the batteries are free to move in any direction with the only constrain being the friction between components. The nominal force is the force divided by the number of cooling columns. Due to the constrain induced by increased dimension in transverse direction, case E (8*4) has slightly higher nominal force. Comparing to case A and case B, the results confirm that the mechanical responses of case A and B are the upper and lower bounds of a realistic battery pack.

According to one embodiment of the present disclosure, an elasto-plastic material can also be used to fill the space between the cells and the cooling columns. Such a material will provide a small (short) elastic segment on the stress-strain curve followed by a long flat plastic segment (also referred to as the plateau region). One such example is a crushable foam, known to a person having ordinary skill in the art. Within such a material, according to one embodiment of the present disclosure, a plurality of sacks may be provided with the material each holding fire or flame retardant fluid or solids. The flame retardant material would be configured to burst out when the plastic formation of the elasto-plastic material reaches a predetermined limit. Such a release will assist in fire control, in case of a thermal run-away situation.

In the disclosure provided herein, the following ranges are provided as representative embodiments and should not be used as limiting the scope of the disclosure. In embodiments where the crushable cooling column are held by the battery cells, the minimum number of cooling columns are two and each cooling column has at least four battery cells. Thus, in this case, the minimum number of battery cells is eight. On the other hand, if battery cells can be held by the cooling column, one cooling column, not two, is sufficient since two cooling columns can hold one column of battery cells. In this case the minimum number of battery cells is four. There is no upper limit except for the dimension of the battery pack in the vehicle. In one embodiment 8000 battery cells can be placed in a pack. To further explain this arrangement, the following description is provided. In Case A, one cooling column is held by two columns of battery cells. In this case, the minimum numbers of battery cells and cooling columns are 8 and 1, respectively. In this case, the locating scheme with appropriate constraints for battery cells must be established. In Case B, one battery column is held by two columns of cooling columns. In this case, the minimum numbers of battery cells and cooling columns are 4 and 2, respectively. In this case, the locating scheme and appropriate constraints for the cooling columns must be established. For the minimum numbers of cooling columns, Case A was chosen since it only requires one cooling column. On the other hand, for the minimum number of battery cells, Case B was chosen since it only requires four battery cells. The following table further describes this relationship.

TABLE 1

Summary of Case A and Case B

| Case | Description | Minimum number of battery cells | Minimum number of cooling columns |
|---|---|---|---|
| A | One cooling column is held by two columns of battery cells | 8 | 1 |
| B | One column of battery cells is held by two cooling columns | 4 | 2 |

The minimum height of the cooling column is approximately the half of the length of the battery cells; thus, if the 18650 cells are used, the minimum cell height should be about 33 mm (65/2). The maximum height of the cooling columns in one embodiment is the height of the battery cell; thus, if the 18650 cells are used, the maximum height is about 65 mm. However, the maximum height of the cooling column may exceed the height of battery cells in other embodiments. Although the excess portion of cooling column beyond the battery cell height will not contribute to the cooling efficiency for the battery pack, it may contribute positively during the collision, where the extra height of cooling column may prevent battery components (e.g., terminals and busbars) from separating from the battery cells and disperse causing further damage. In yet another embodiment, multiple battery cells could be staked in the axial direction similar to battery cells inside a flashlight. In this case, the height of the cooling column must cover the entire length of the multiple cells that creates a battery stack.

The minimum length of the cooling column is calculated when cells are placed as depicted in FIG. 7A Case A with minimal gaps between horizontal cells. In this case, the cooling column are straight column without any concave surfaces for receiving battery cells. Thus, the minimum length of the cooling column is as follows: $D_{cell} \times n$, where $D_{cell}$ is the diameter of the battery cell, and n is the number of battery cells in a column. Thus, if four 18650 cells are used in a column, the minimum length of the cooling column is about 72 mm (18 mm*4 cells). The maximum length of the cooling column is calculated when the cooling column moves between the top and bottom column as shown in FIG. 7D, Case B. In this case, each cell takes the length of $$\left(\frac{D_{cell}}{2} + \frac{t}{2}\right) \cdot \frac{\pi}{2},$$

where $D_{cell}$ is the diameter of the battery cell, and t is the thickness of the cooling column. This calculation assumes the maximum contact angle between the cooling column and the battery cells of 90 degree with respect to the axis of the battery's circular cross section.

The maximum length of the cooling column is calculated as follows:

$$\text{Maximum Length} = (D_b/2 + t/2) \cdot \pi/2 \cdot n = (18 \text{ mm}/2 + 6 \text{ mm}/2) \cdot \pi/2 \cdot 8 = 150.796, \text{ which is about } 151 \text{ mm},$$

where $D_b$=diameter of the battery cell (about 18 mm for a 18650 cell)

t=thickness of the cooling column (about 6 mm for a 18650 cell)

n=total number of battery cells in contact with the cooling column (about 8 cells).

The minimum thickness of the cooling column is between about 0.3 mm to 0.5 mm, depending on the cooling fluid. The minimum wall thickness of the cooling column in each side, based on manufacturing capability, is 0.1 mm. This provides between about 0.1 to 0.3 mm channel width for the cooling fluid to go through.

The maximum thickness of the cooling column is approximately ⅓ of the battery cell diameter. Thus, if the 18650 cells are used, the maximum thickness of the cooling column is about 6.0 mm (=18.0 mm/3).

As stated in above, if two columns of battery cells can hold a cooling column, the minimum number of cooling column is one. On the other hand, if a single column of battery cells can be held by cooling columns, the minimum number of cooling columns is two, as described above.

The maximum number of cooling columns is dependent on vehicular geometry. In one embodiment the maximum number is 100 and as long as cooling fluid temperature difference between inlet and outlet is not too significantly different since large temperature differences (i.e., uneven temperature distribution within battery pack) causes uneven battery degradation, which shortens the life of the battery pack.

One type of cooling fluid can be engine coolant (i.e., a mixture of water and ethylene glycol).

The maximum volumetric density, which is also known as a circle packing on 2D plane, is $\pi \cdot \text{Sqrt}(3)/6$ which is about 90.7% or approximately stated as 90%. However, at 90% volumetric density, there is no place for the cooling columns to be placed since the battery cells are right next each other without any space for the cooling columns to be placed, unless the cooling column runs in the longitudinal direction of the battery cells. Also, at this level, all kinetic energy dissipation is done by the permanent deformation of battery cells, which is not desirable. Thus, the maximum volumetric density of battery cell should be slightly less than 90%, so that a) cooling columns can be placed between battery cells and b) the volumetric density of battery cells can be maximized.

On the other hand, zero volumetric density of battery cells means that there is no battery cell in a battery pack; thus, such battery pack is simply a deadweight, which is highly undesirable. Also, low volumetric density (say 50% or less) simply waste the precious space in the battery compartment of the vehicle without storing enough energy for vehicle propulsion. Although no specific lower range number can be easily given (since it depends on the design of battery pack), we presume the reasonable minimum value of about 50%.

In solid mechanics, strain is defined as deformation/original dimension. Thus, the maximum compression strain of 0 means zero deformation, which is directed at the maximum density for the battery cells. On the other hand, the compression strain of 1.0 (or rather 0.99 since the deformation cannot be the same as the original dimension) suggests the minimum (almost zero) volumetric density of the battery cells. Thus, a reasonable range of critical compression strain is about 0.4 to about 0.5 (i.e., the percentage of deformation with respect to the original length is about 40 to about 50%).

In the case of 18650 cells, the minimum and maximum nominal forces per column are approximately 500 N and 3500 N, respectively. The minimum (about 500 N) is shown in FIG. 8 as the value for the plateau (flat) regime of the first case, which is specified as "End Constrained, RF1, front-end, Case B." On the other hand, the maximum (3500 N) is also shown in FIG. 8 as the last case, which is specified as "Fully Constrained, RF1, back-end, Case A," at a point where the plateau (flat) regime is approximately transitioning into the densification (high slope) regime.

As far as various flame retardant material, choice of material depends on the chemistry of the battery cells. If the lithium-ion battery cells are used, Lith-X fire extinguishing agent (or equivalent) for a Class D fire extinguisher is desirable.

Those having ordinary skill in the art will recognize that numerous modifications can be made to the specific implementations described above. The implementations should not be limited to the particular limitations described. Other implementations may be possible.

The invention claimed is:

1. A battery packaging arrangement, comprising:
    a plurality of cylindrical battery cells disposed on a smooth platform;
    a first base configured to be fixedly coupled to a frame of a vehicle,
    a second base moveable with respect to the first base along a loading direction and a distance away from the first base, thereby defining an internal volume between the first base and the second base;
    a plurality of cooling columns inter-disposed between the first base and the second base, each of the plurality of cooling columns having a plurality of receiving surfaces for receiving a corresponding subset of the plurality of battery cells thereby defining a volumetric density of volume of the battery cells divided by the internal volume when the interior volume is fully utilized with a maximum number of battery cells,
    each of the plurality of cooling columns further configured to deform when the second base in response to a force defining a pressure moves towards the first base along the loading direction; wherein the deformation is i) reversible when the pressure is below a predetermined threshold (elastic mode), during the elastic mode the volumetric density increases by elastically deforming and allowing the battery cells to move at least along the loading direction; ii) irreversible when the pressure exceeds the predetermined threshold (plastic mode), during the plastic mode the volumetric density continues to increase up to a maximum volumetric density by plastically deforming and allowing the battery cells to move at least along the loading direction; and iii) critical when the pressure reaches a critical limit (critical mode), at which point the volumetric density begins to decrease from the maximum volumetric density by plastically deforming and allowing the battery cells to move along the loading direction and along a transverse direction perpendicular to the loading the direction, wherein the plurality of battery cells receive forces only by the plurality of cooling columns or other battery cells of the plurality of battery cells along the loading direction in the reversible and irreversible deformation, and wherein the cooling columns are coupled in a parallel configuration such that operational temperature at each of the two bases is substantially the same, wherein substantially represents a value between 90% and 99% of the corresponding value, and there is a temperature gradient between the first base and the second base.

2. The battery packaging arrangement of claim 1, where each cooling column is hollow and configured to pass a coolant therethrough.

3. The battery packaging arrangement of claim 2, the coolant is a fluid.

4. The battery packaging arrangement of claim 3, the coolant is a gas.

5. The battery packaging arrangement of claim 3, the coolant is a liquid.

6. The battery packaging arrangement of claim 1, a unit cell of the cooling columns and battery cells define is a 4*4 matrix, a 5*5 matrix, a 6*6 matrix, a 7*7 matrix, or a 8*4 matrix.

7. The battery packaging arrangement of claim 1, further comprising an elasto-plastic material disposed between the plurality of cooling columns and the battery cells.

8. The battery packaging arrangement of claim 7, the elasto-plastic material includes a plurality of sacks each filled with a fire-retardant substance configured to burst open once the elasto-plastic material has plastically deformed to a predetermined plastic deformation level, thereby releasing the fire-retardant material.

9. A method of absorbing impact force by a battery packaging arrangement, comprising:
    providing a plurality of cylindrical battery cells disposed on a smooth platform;
    moving a first base in response to an impact force defining a pressure with respect to a second base a distance away from the first base along a loading direction, thereby defining an internal volume between the first base and the second base which is configured to be fixedly coupled to a frame of a vehicle,
    deforming a plurality of cooling columns inter-disposed between the first base and the second base in response to the impact force, each of the plurality of cooling columns having a plurality of receiving surfaces for receiving a corresponding subset of the plurality of battery cells, thereby defining a volumetric density of volume of the battery cells divided by the internal volume when the interior volume is fully utilized with a maximum number of battery cells;

wherein the deformation is i) reversible when the pressure is below a predetermined threshold (elastic mode), during the elastic mode the volumetric density increases by elastically deforming and allowing the battery cells to move at least along the loading direction; ii) irreversible when the pressure exceeds the predetermined threshold (plastic mode), during the plastic mode the volumetric density continues to increase up to a maximum volumetric density by plastically deforming and allowing the battery cells to move at least along the loading direction; and iii) critical when the pressure reaches a critical limit (critical mode), at which point the volumetric density begins to decrease from the maximum volumetric density by plastically deforming and allowing the battery cells to move along the loading direction and along a transverse direction perpendicular to the loading the direction, wherein the plurality of battery cells receive forces only by the plurality of cooling columns or other battery cells of the plurality of battery cells along the loading direction in the reversible and irreversible deformation, and wherein the cooling columns are coupled in a parallel configuration such that operational temperature at each of the two bases is substantially the same, wherein substantially represents a value between 90% and 99% of the corresponding value, and there is a temperature gradient between the first base and the second base.

10. The method of claim 9, where each cooling column is hollow and configured to pass a coolant therethrough.

11. The method of claim 10, the coolant is a fluid.

12. The method of claim 11, the coolant is a gas.

13. The method of claim 11, the coolant is a liquid.

14. The method of claim 9, a unit cell of the cooling columns and battery cells define is a 4*4 matrix, a 5*5 matrix, a 6*6 matrix, a 7*7 matrix, or a 8*4 matrix.

15. The method of claim 9, further comprising an elasto-plastic material disposed between the plurality of cooling columns and the battery cells.

16. The method of claim 15, the elasto-plastic material includes a plurality of sacks each filled with a fire-retardant substance configured to burst open once the elasto-plastic material has plastically deformed to a predetermined plastic deformation level, thereby releasing the fire-retardant material.

* * * * *